(12) United States Patent
Joukov

(10) Patent No.: US 8,825,901 B2
(45) Date of Patent: Sep. 2, 2014

(54) DISTRIBUTED PARALLEL DISCOVERY

(75) Inventor: Nikolai A. Joukov, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 606 days.

(21) Appl. No.: 12/702,575

(22) Filed: Feb. 9, 2010

(65) Prior Publication Data

US 2011/0196984 A1   Aug. 11, 2011

(51) Int. Cl.
*G06F 15/173* (2006.01)

(52) U.S. Cl.
USPC ........... 709/240; 709/224; 709/229; 455/436; 370/229

(58) Field of Classification Search
USPC ........... 709/224, 240, 229; 455/436; 370/229
See application file for complete search history.

(56) References Cited

U.S. PATENT DOCUMENTS

| | | | |
|---|---|---|---|
| 6,058,426 A * | 5/2000 | Godwin et al. | 709/229 |
| 6,925,453 B1 * | 8/2005 | Bergman et al. | 706/20 |
| 7,401,132 B1 * | 7/2008 | Krumel et al. | 709/220 |
| 2002/0040393 A1 * | 4/2002 | Christensen | 709/224 |
| 2003/0161268 A1 * | 8/2003 | Larsson et al. | 370/229 |
| 2009/0276520 A1 * | 11/2009 | Weerakoon et al. | 709/224 |
| 2010/0003980 A1 * | 1/2010 | Rune et al. | 455/436 |

OTHER PUBLICATIONS

Joukov, N., et al. "Built-To-Order Service Engineering for Enterprise It Discovery" 2008 IEEE International Conference on Services Computing (SCC 2008). Jul. 2008. pp. 1-8.

* cited by examiner

Primary Examiner — Michael C Lai
(74) Attorney, Agent, or Firm — Tutunjian & Bitetto, P.C.; Louis Percello

(57) ABSTRACT

A system and method for parallel discovery includes grouping a set of nodes including redundant information. After a first discovery stage, a portion of the set of nodes is selected to perform an additional discovery stage. The additional discovery stage is performed with the portion of the set of nodes where each node makes a decision whether to perform the additional stage or not.

14 Claims, 2 Drawing Sheets

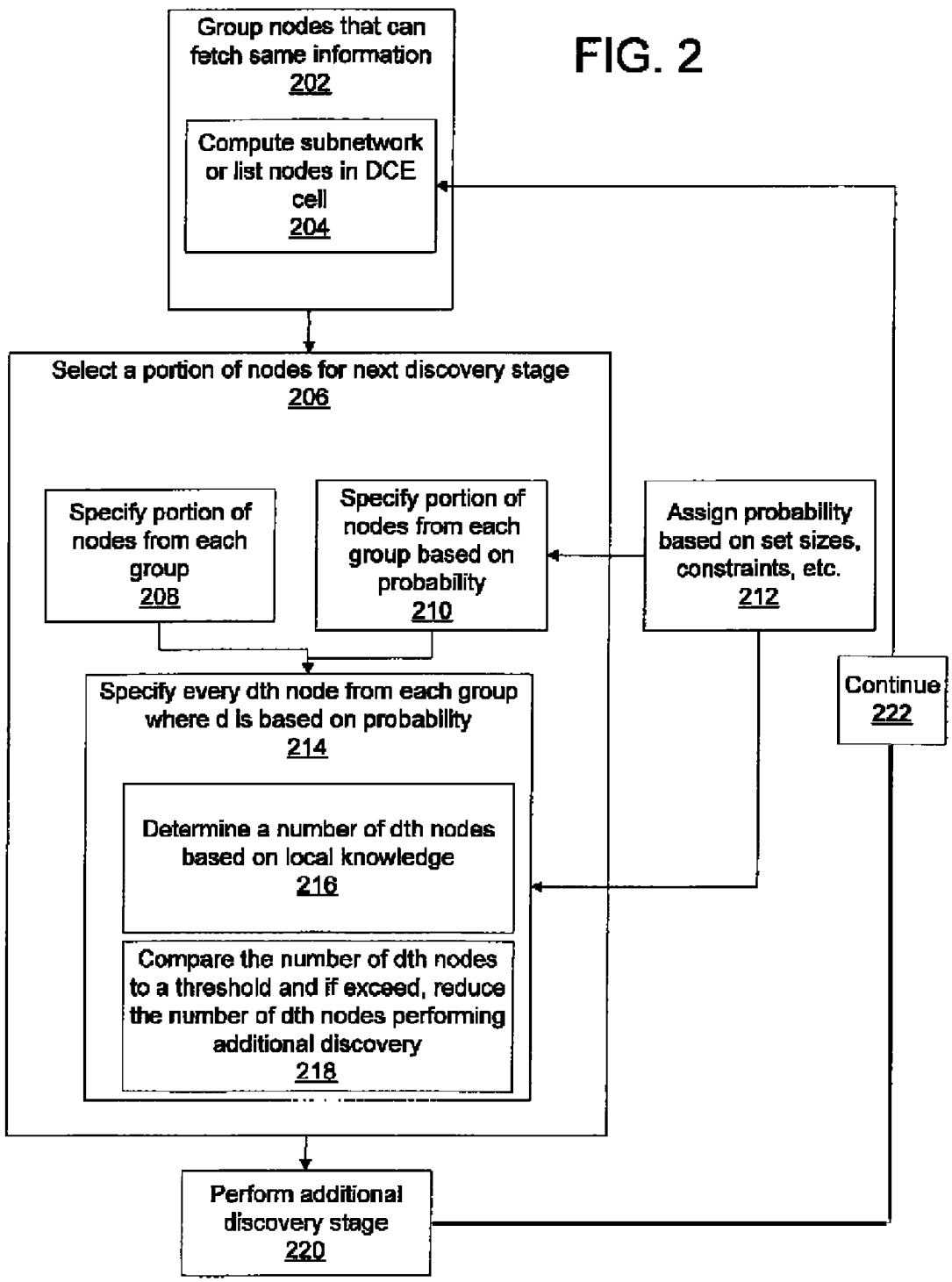

DISTRIBUTED PARALLEL DISCOVERY

BACKGROUND

1. Technical Field

The present invention relates to distributed discovery in a computer environment, and more particularly to a parallel discovery system and method that reduces network traffic and improves efficiency.

2. Description of the Related Art

Most if not all information technology (IT) optimization tasks require IT asset, configuration, and operation characteristics discovery performed before the actual IT optimization can be planned and executed. A common strategy is to perform discovery in stages: first discover basic information and then discover more detailed information. For example, one usually starts from scanning networks to list the hosts and their IP addresses. After that, a per-host discovery may be performed to get basic system information. Next, it is usually desirable to discover per-middleware information.

Each of these stages frequently requires several sub-stages because certain information cannot be discovered without first discovering some other information. Here are two practical examples: 1) Each Distributed Computing Environment (DCE) or Andrew File System (AFS) cell member possesses information about the overall cell configuration including very detailed information at the level of per-directory data locations on each file server. Unfortunately, gathering this information takes time, and large volumes of collected information add network and storage overheads and inconvenience for these who perform the scans. So it is desirable to first discover cells and lists of their members and only after that gather cell-specific information on only one member node. 2) Network topology or security zone discovery may require sending out probing packets. If all servers being discovered send out such probing requests, they will generate noticeable network traffic and may easily trigger network detection systems leading to network outages of whole data centers. Therefore, subnetworks should first be discovered and only one subnetwork member should be asked at a time to send out the probing packets.

Unfortunately, each discovery stage costs money and takes time. For example, if system administrators are involved in the discovery process, they would need to run the scripts twice: first to locate cells or subnetworks and next to run some other script on a smaller set of servers. The problem is exacerbated by the fact that it is usually impossible to establish any information exchanges between the servers being scanned for the discovery scripts to make a collective decision during a first run.

SUMMARY

A system and method for parallel discovery includes grouping a set of nodes including redundant information. After a first discovery stage, a portion of the set of nodes is selected to perform an additional discovery stage. The additional discovery stage is performed with the portion of the set of nodes where each node makes a decision whether to perform the additional stage or not.

An information technology system for discovery includes a plurality of nodes forming a network structure. A discovery script is loaded on one or more of the plurality of nodes to determine a total maximal number of nodes that can fetch same information in a node group. The discovery script is configured to, after a first discovery stage, select a portion of the plurality of nodes to perform an additional discovery stage from the node group. The discovery script is further configured to perform the additional discovery stage using a reduced number of nodes by selecting the reduced set of nodes in accordance with a probability assigned to nodes or in accordance with selecting only every $d^{th}$ node in the portion to perform the additional discovery stage, where d depends on the probability.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 2 is a block/flow diagram showing a system/method for parallel discovery in accordance with a more detailed embodiment.

DETAILED DESCRIPTION OF PREFERRED EMBODIMENTS

Figure 1:
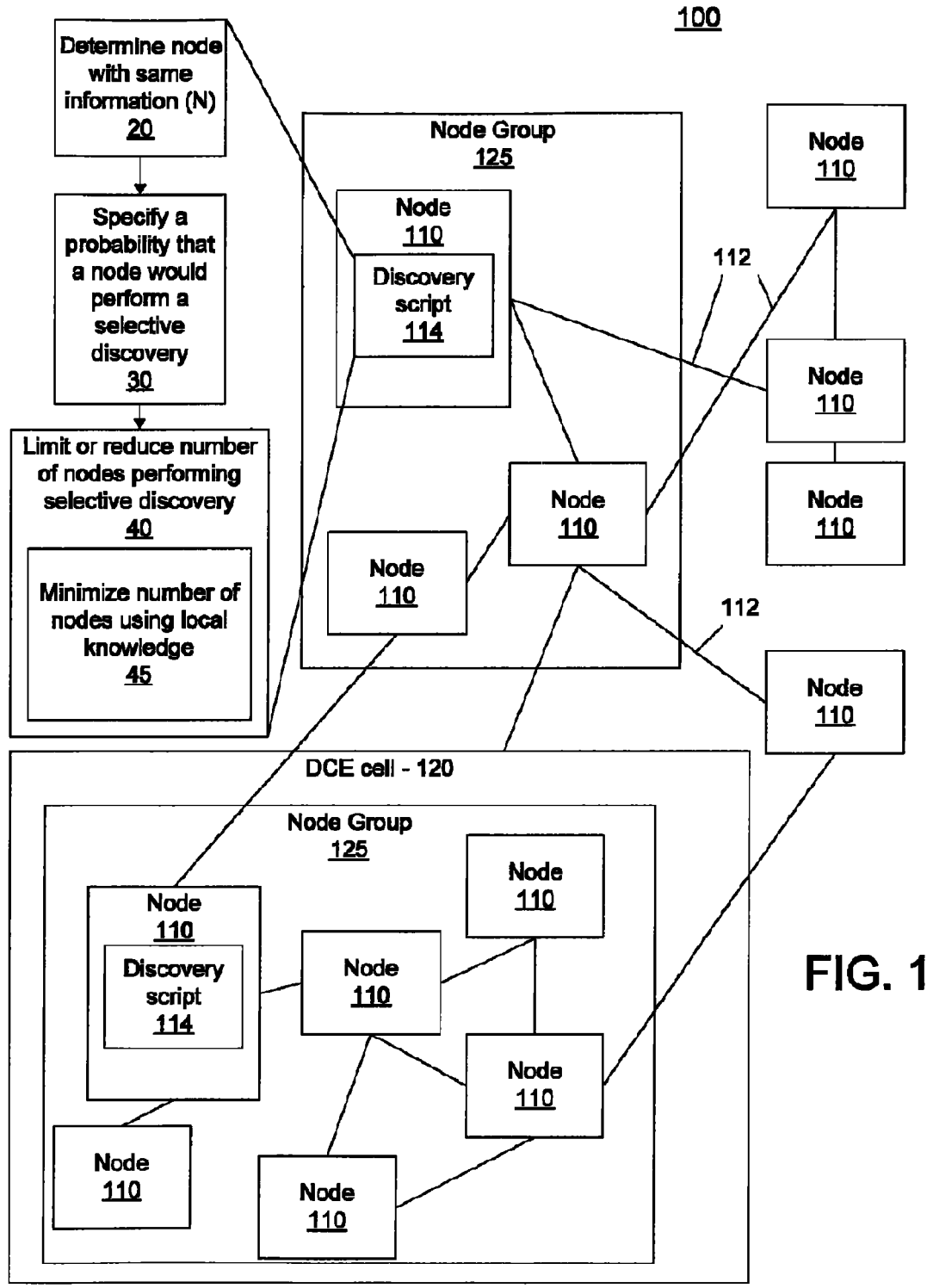
FIG. 1 is a block/flow diagram showing a system/method for parallel discovery where a subset of nodes are selected to perform additional discovery stages in accordance with the present principles.

In accordance with the present principles, discovery scripts are made to decide probabilistically if they need to do just a first discovery stage (e.g., cell membership discovery) or perform a more detailed discovery. This permits discovery in a single stage instead of multiple stages on only a small subset of the nodes without extra effort from the discovery teams and without any communication between the nodes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, a block/flow diagram showing a system/method for distributed parallel discovery is illustratively depicted. An IT system 100 includes a plurality of nodes 110 and optional connections 112 therebetween. A discovery script(s) 114 may be loaded on one or more of the nodes 110. In block 20, each discovery script on a node knows a total maximal number of nodes that can fetch the same information (N). For example, a script 114 can easily calculate a subnetwork size based on a network mask, and a Distributed Computing Environment (DCE) cell member node 110 can list all participating nodes for a cell. We will call a set of nodes of this type a node group 125.

DCE is a set of software components that provides a platform for the construction and use of distributed applications. The DCE directory services provide access for applications and users to a federation of naming systems at the global, enterprise, and application levels. The directory services of the DCE enable distributed applications to use a variety of naming systems, both within and outside a DCE cell 120. Naming systems make it possible to give an object a textual name that is easier for humans to use—easier to read, pronounce, type, remember, and intuit—than an identifier such as a DCE universal unique identifier (UUID). Information about the locations of objects can be stored in naming systems so that users can access an object by name, with no a priori knowledge of its location. Cell 120 may include an Andrew File System (AFS) cell. AFS is a distributed file system that enables co-operating hosts (clients and servers) to efficiently share file system resources across both local area and wide area networks.

It is often possible for all nodes to know some IDs of each participating node. For example, each node may have an IP address in a given subnetwork and each DCE node has a node name. Unfortunately, the total number of nodes that are operational and will be scanned is unknown. We can only assume that it is a subset of N.

In block 30, depending on the type of discovery, we specify the probability that a given node would perform a selective discovery. For example, we can specify that a predetermined number of nodes from each cell, e.g., at least 5 nodes from each cell, should try to perform an extra discovery stage. Thus, each node would decide to perform extra discovery with probability $P=5/N$. This is useful for example, if we want to limit the total number of packets sent out per subnetwork.

Alternatively, in block 30, we can specify that each node should perform the extra discovery with some fixed probability, P, if we are not limited by a total number of scans. P should be selected to be sure that even in node groups with sparse node presence, we get at least one node to perform the scan with a reasonable chance of being performed. The probability assignment strategies can be combined to get desired results for various node set sizes and discovery constraints.

In block 40, the maximal number of nodes performing the discovery may be constrained or limited. A true random number generator for selecting which nodes to perform additional discovery is not desirable because this method can generate fluctuation sets with too many nodes doing the discovery, which can potentially harm the environment being discovered. Instead, it is preferable to rely on potential node IDs. For example, we can sort node names that belong to a DCE cell and sort nodes by their IP addresses. Therefore, we can decide that only every $d^{th}$ node performs the discovery, where d depends on the probability P, e.g., d=1/P.

Note that in most cases even if no node ends up doing the once per-group discovery, we can still perform this discovery as an extra stage for these groups. This will add some time and cost to the overall discovery effort but only for some node groups and at least we will not harm the target systems.

In block 45, a further optimization may be employed to minimize the number of nodes selected to do a next stage discovery may include local knowledge on the nodes about the other nodes from the group. For example, caches on the nodes may indicate that some other nodes are alive. These alive nodes may be expected to also calculate probability and decide to do the scan. Therefore, if a node sees that there are, say four $d^{th}$ nodes, it can decide that only each $d^{th}/2$ node should do the scan. This can further reduce the number of nodes having to do additional or a next stage of discovery. In accordance with the present embodiments, each node can be made to decide whether to perform an additional discovery stage or not. Whether by pre-assigned probabilities, by assignments of certain nodes, etc. as described herein.

Referring to FIG. 2, a system/method for discovery is illustratively depicted. In block 202, a set of nodes are grouped. The nodes include redundant information. This includes determining a node group from a total maximal number of nodes that can fetch the same information. In block 204, the node group may include computing a subnetwork based on a network mask, listing participating nodes in a Distributed Computing Environment (DCE) cell, etc.

In block 206, after a first discovery stage, a portion of the set of nodes is selected to perform an additional discovery stage. The selection may include specifying a number of nodes from each of the set of nodes to perform the additional discovery stage in block 208. In block 210, a number of nodes may be specified from each of the set of nodes to perform the additional discovery stage in accordance with a fixed probability. If a probability is determined to be high enough (or low enough), that node is selected for the additional discovery stage. The probability can be computed based upon the criteria related to the network conditions or amount of redundant information.

In block 212, the probability may be assigned for different node set sizes and discovery constraints. The probability is assigned to the nodes such that after the first discovery stage a subsequent stage can be planned based upon the assigned probabilities. These may include 1) predefined per-node probability to proportionally reduce the effects or costs of discovery or 2) probability calculated so that the total number of nodes doing the second discovery stage is limited (e.g., to limit the total number of probing network packets as described above).

In block 214, the number of nodes may be specified by deciding that only every $d^{th}$ node in the portion of the set of nodes needs to perform the additional discovery stage. The number d may depend on the probability P assigned to each node. In block 216, a number of $d^{th}$ nodes may be determined in each portion. This may be based on local knowledge, such as information listed in caches, or known by other parts of the node. In block 218, if the number of $d^{th}$ nodes in the portion is greater than a threshold (e.g., greater than one), the number of $d^{th}$ nodes in the portion that perform the addition discovery stage can be further reduced. E.g., divide by a number or reduce the number by a fixed amount, etc.

In block 220, the additional discovery stage is performed with the portion of the set of nodes. In block 222, the process may be continued for additional discovery stages.

Having described preferred embodiments of a system and method for distributed parallel discovery (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for discovery, comprising:
grouping a set of nodes that can fetch same information;
after a first discovery stage, selecting a portion of the set of nodes, using a processor, to perform an additional discovery stage based on a decision of each node; and
performing the additional discovery stage with the portion of the set of nodes wherein each node makes a decision whether to perform the additional discovery stage,
wherein selecting the portion of the set of nodes includes specifying a number of nodes from the set of nodes to perform the additional discovery stage in accordance with a fixed probability assigned for different node set sizes and discovery constraints, and specifying the number of nodes includes deciding that only every dth node in the portion performs the additional discovery stage, where d depends on the probability and local knowledge on the nodes about the other nodes from the set.

2. The method as recited in claim 1, wherein grouping includes determining a node group from a total maximal number of nodes that can fetch same information.

3. The method as recited in claim 2, wherein determining a node group includes computing a subnetwork size based on a network mask.

4. The method as recited in claim 2, wherein determining a node group includes listing participating nodes in a Distributed Computing Environment (DCE) cell.

5. The method as recited in claim 1, further comprising:
determining a number of dth nodes in the portion; and
if the number of dth nodes in the portion is greater than a threshold, reducing the number of dth nodes in the portion that perform the additional discovery stage.

6. A non-transitory computer readable storage medium comprising a computer readable program for discovery, wherein the computer readable program when executed on a computer causes the computer to:
grouping a set of nodes that can fetch same information;
after a first discovery stage, selecting a portion of the set of nodes to perform an additional discovery stage; and
performing the additional discovery stage with the portion of the set of nodes wherein each node makes a decision whether to perform the additional discovery stage,
wherein selecting the portion of the set of nodes includes specifying a number of nodes from the set of nodes to perform the additional discovery stage in accordance with a fixed probability assigned for different node set sizes and discovery constraints, and specifying the number of nodes includes deciding that only every dth node in the portion performs the additional discovery stage, where d depends on the probability and local knowledge on the nodes about the other nodes from the set.

7. The non-transitory computer readable storage medium as recited in claim 6, wherein grouping includes determining a node group from a total maximal number of nodes that can fetch same information.

8. The non-transitory computer readable storage medium as recited in claim 7, wherein determining a node group includes computing a subnetwork size based on a network mask.

9. The non-transitory computer readable storage medium as recited in claim 7, wherein determining a node group includes listing participating nodes in a Distributed Computing Environment (DCE) cell.

10. The non-transitory computer readable storage medium as recited in claim 6, further comprising:
    determining a number of dth nodes in the portion; and
    if the number of dth nodes in the portion is greater than a threshold, reducing the number of dth nodes in the portion that perform the additional discovery stage.

11. An information technology system for discovery, comprising:
    a plurality of nodes forming a network structure;
    a discovery script loaded on one or more of the plurality of nodes, to determine a total maximal number of nodes that can fetch same information in a node group, the discovery script being configured to, after a first discovery stage, select a portion of the plurality of nodes to perform an additional discovery stage from the node group, the discovery script being further configured to perform the additional discovery stage using a reduced number of nodes by selecting the reduced set of nodes in accordance with a fixed probability assigned for different node set sizes and discovery constraints and selecting only every dth node in the portion to perform the additional discovery stage, where d depends on the probability and local knowledge on the nodes about the other nodes from the set.

12. The system as recited in claim 11, wherein the node group includes a subnetwork.

13. The system as recited in claim 11, wherein the node group includes participating nodes in a Distributed Computing Environment (DCE) cell.

14. The system as recited in claim 11, further comprising a threshold which is compared to the number of dth nodes in the portion such that if the number of dth nodes in the portion is greater than a threshold, the number of dth nodes is reduced in the portion for performing the additional discovery stage.

* * * * *